United States Patent [19]

Bowman

[11] Patent Number: 4,842,148
[45] Date of Patent: Jun. 27, 1989

[54] QUICK RELEASE BICYCLE RACK

[76] Inventor: Tracy L. Bowman, 2848 Auburn Blvd. #2, Sacramento, Calif. 95821

[21] Appl. No.: 159,103

[22] Filed: Feb. 23, 1988

[51] Int. Cl.$^4$ .............................................. B60R 9/10
[52] U.S. Cl. .................................... 211/18; 248/316.1
[58] Field of Search ................. 211/17, 18; 248/309.1, 248/309.2, 316.1, 316.2, 317, 500; D12/115; 224/42.03 B, 315, 323; 272/73; 410/3, 66, 77

[56] References Cited

U.S. PATENT DOCUMENTS

| 3,125,341 | 3/1964 | Carrington . |
| 3,828,993 | 8/1974 | Carter . |
| 3,848,784 | 11/1974 | Shimano et al. . |
| 3,924,787 | 12/1975 | Gothrup . |

FOREIGN PATENT DOCUMENTS

| 3034750 | 4/1982 | Fed. Rep. of Germany ...... 224/315 |
| 2527149 | 11/1983 | France ........................... 224/42.03 B |
| 7465 | of 1897 | United Kingdom .................. 211/18 |

Primary Examiner—J. Franklin Foss
Assistant Examiner—Robert A. Olson
Attorney, Agent, or Firm—Jerry T. Kearns

[57] ABSTRACT

A quick release bicycle rack has a planar base provided with a generally rectangular upstanding mounting block. The mounting block has a reduced width portion and an enlarged width portion, each provided with a transversely extending cylindrical bore. A conventional quick release spindle, of the type utilized to mount bicycle wheels on the slotted forks of a bicycle frame, is selectively received through one of these transverse bores. In use, one wheel of a bicycle is removed and the slotted forks are clamped against the mounting block by the quick release mechanism. By inserting the quick release spindle through either the reduced or the enlarged width portion of the mounting block, the device may be utilized with bicycles having two different standard fork frame width dimensions. The mounting plate is provided with apertures for the reception of threaded fasteners for securing the mounting block to a horizontal or vertical planar surface. In a second embodiment, the mounting block may be provided with rubber bumpers for abutment with the slotted bicycle forks, a pivotal mounting bracket for allowing the mounting block to be adjustably positioned on a planar mounting surface, and a hook for retaining the removed bicycle wheel.

9 Claims, 5 Drawing Sheets

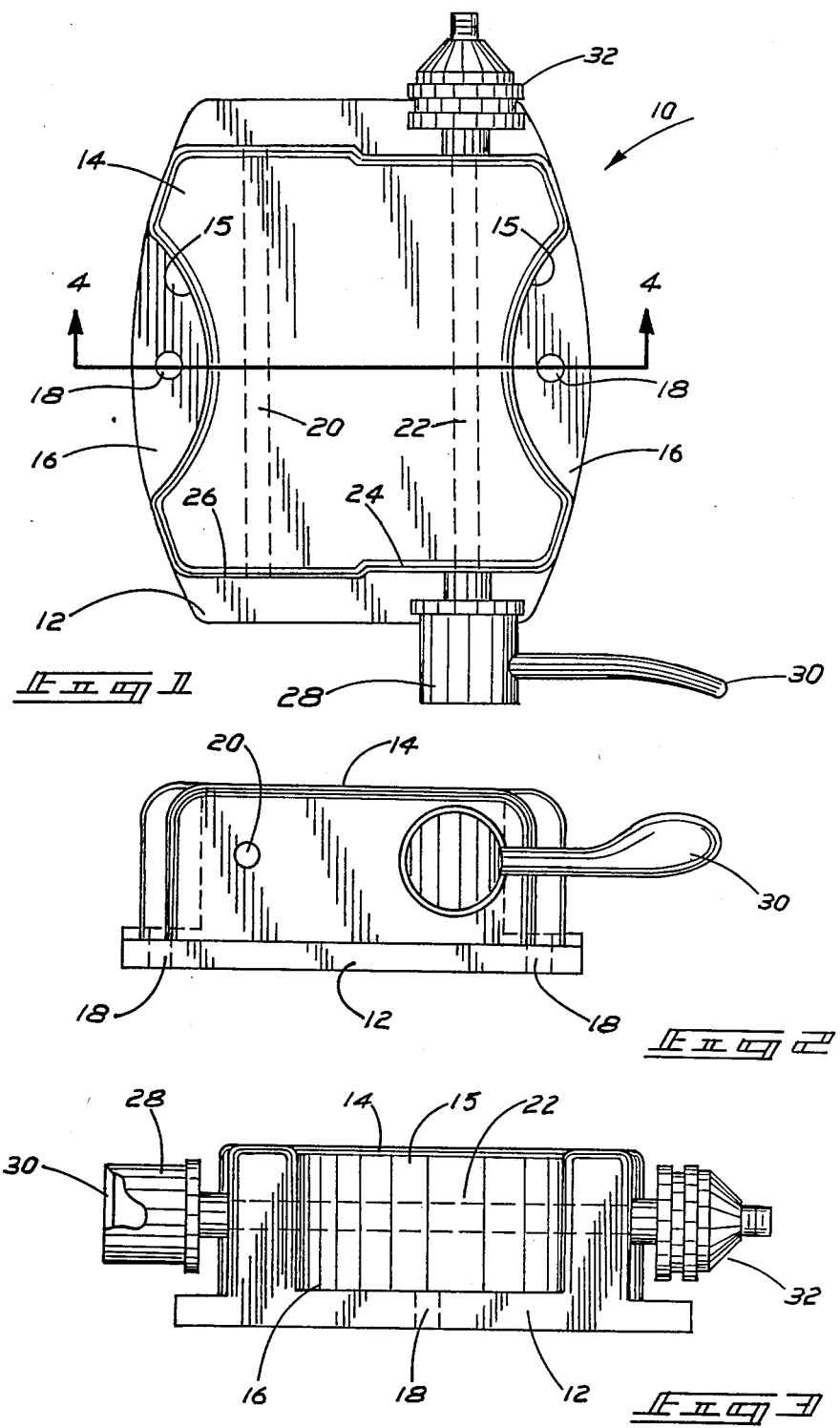

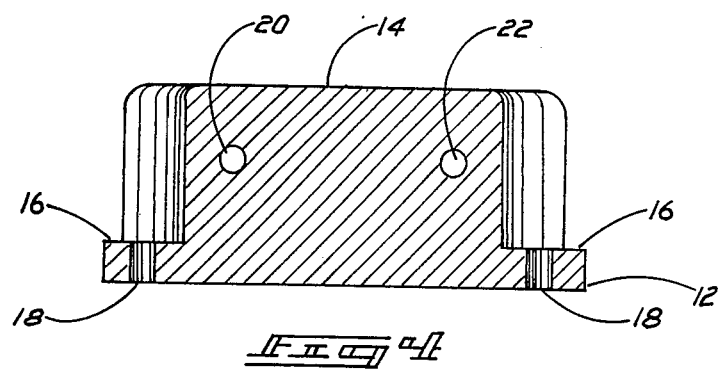
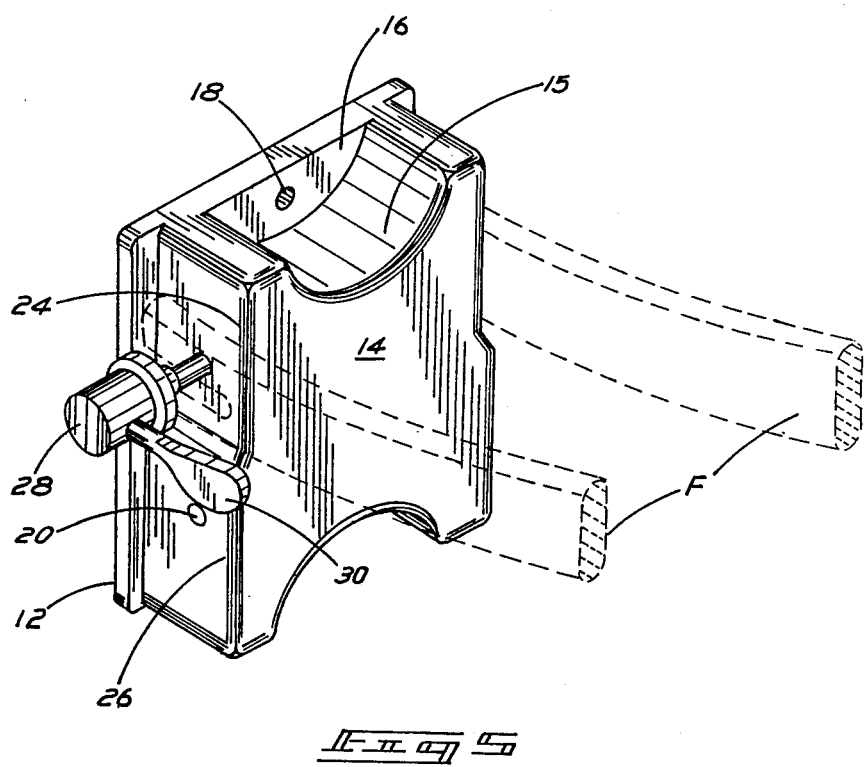

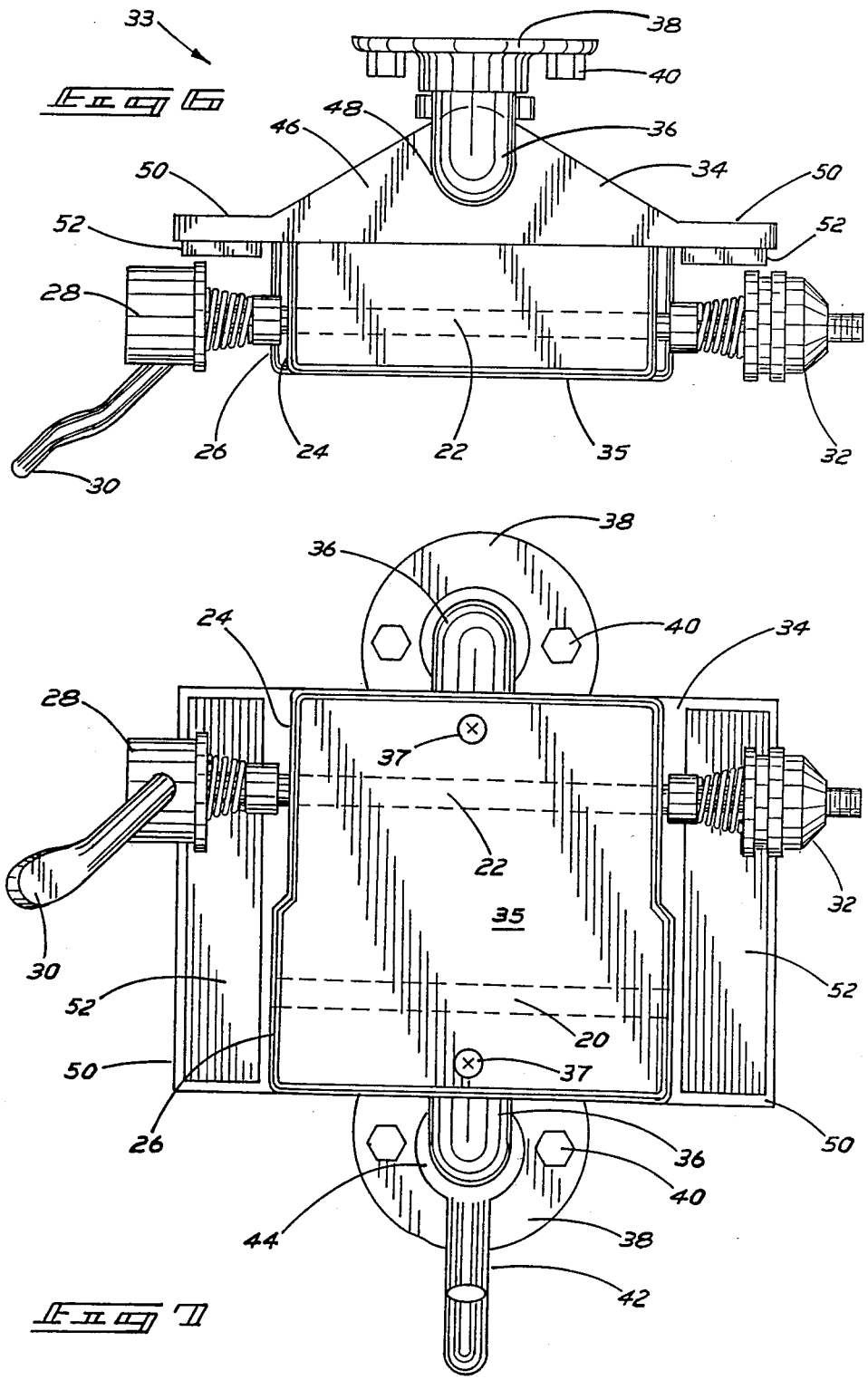

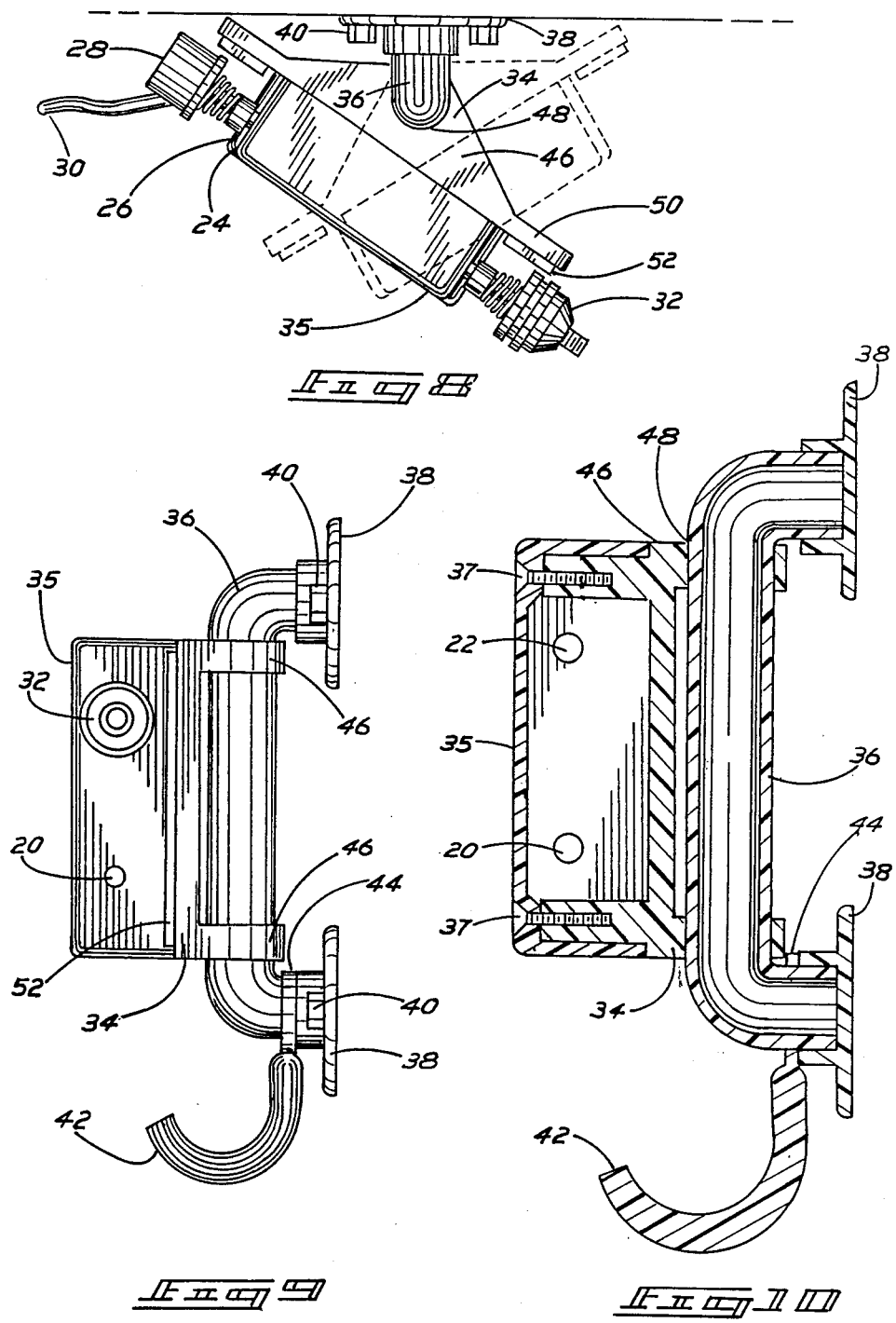

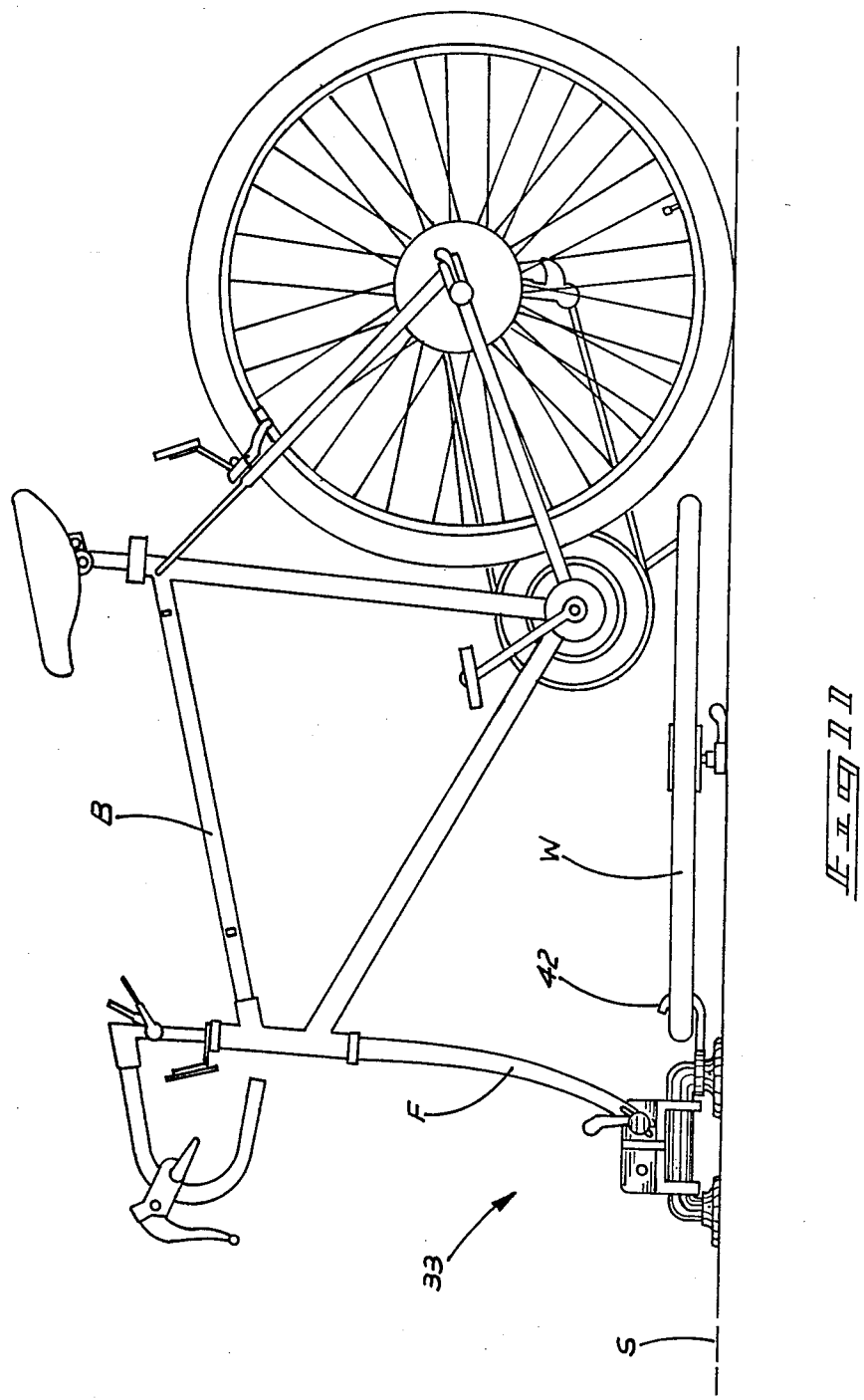

QUICK RELEASE BICYCLE RACK

BACKGROUND OF THE INVENTION

1. Field of the Invention

The present invention relates to bicycle racks, and more particularly pertains to a quick release bicycle rack which utilizes a conventional quick release spindle of the type utilized to mount a bicycle wheel on the slotted forks of a bicycle. Many individuals who reside in apartments, condominiums and town houses have a limited amount of space available for bicycle storage. Additionally, retail bicycle sales outlets have a need to store and display a large number of bicycles in a limited space. Additionally, bicycle owners and bicycle repair shops require a simple economical and easy to use device to hold a bicycle while repairs are made. The present invention solves these problems by providing an economical bicycle rack which utilizes a conventional quick release spindle to retain the slotted forks of a bicycle on a mounting block. The bicycle rack of the present invention may be secured to vertical as well as horizontal surfaces to enable a bicycle to be stored in narrow spaces such as on a closet wall or in a corner of a room or hallway. Additionally, the quick release bicycle rack of the present invention may be utilized to store a bicycle while being transported on the roof of an automobile, in a train or on a bus.

2. Description of the Prior Art

Various types of bicycle racks are known in the prior art. A typical example of such a bicycle rack is to be found in U.S. Pat. No. 3,125,341, which issued to J. Carrington on Mar. 17, 1964. This patent discloses an attachment for converting a conventional bicycle to a stationary exercise bicycle. The device utilizes a stand provided with a spring clamping mechanism for engaging the rear axle of the bicycle. U.S. Pat. No. 3,828,993, which issued to J. Carter on Aug. 13, 1974, discloses a roof rack for transporting a bicycle on the top of an automobile. The device includes an elongated spindle provided with threaded wing nuts for clamping the slotted front forks of a bicycle frame against a mounting sleeve. The front wheel of the bicycle is removed and the front bicycle forks are placed into engagement with the clamping spindle. U.S. Pat. No. 3,848,784, which issued to K. Shimano et al on Nov. 19, 1974, discloses a roof rack for transporting bicycles on the roof of a vehicle. A hollow sleeve is provided at each bicycle storage location on the rack. A quick release spindle is received through the hollow sleeve and is utilized to clamp the slotted front forks of a bicycle frame against the ends of the hollow sleeve. A plurality of these quick release mechanisms are staggered along the rack and are positioned alternately at the front and rear of the rack for securing a number of bicycles facing in alternating directions. U.S. Pat. No. 3,924,787, which issued to J. Gothrup on Dec. 9, 1975, discloses a bicycle rack for transporting a bicycle on the bumper of a vehicle. The device includes a slotted bracket for engagement with the axles of the bicycle.

None of these devices provide a bicycle rack which utilizes a quick release mounting spindle on a mounting block which may be positioned on any horizontal or vertical surface. Additionally, none of the aforesaid bicycle racks utilize a mounting block provided with stepped width portions provided with transverse bores for enabling the securement of bicycles having various different standard frame fork widths utilizing a conventional quick release mounting spindle. Additional features of the present invention, not contemplated by the aforesaid prior art devices, include a pivotal mounting bracket for adjustably securing a quick release mounting block to a horizontal or vertical surface, rubber bumpers for engagement with the ends of slotted bicycle frame forks, and a hook for retaining a removed bicycle wheel. Inasmuch as the art is relatively crowded with respect to these various types of bicycle racks, it can be appreciated that there is a continuing need for and interest in improvements to such bicycle racks, and in this respect, the present invention addresses this need and interest.

SUMMARY OF THE INVENTION

In view of the foregoing disadvantages inherent in the known types of bicycle racks now present in the prior art, the present invention provides an improved quick release bicycle rack. As such, the general purpose of the present invention, which will be described subsequently in greater detail, is to provide a new and improved quick release bicycle rack which has all the advantages of the prior art bicycle racks and none of the disadvantages.

To attain this, representative embodiments of the concepts of the present invention are illustrated in the drawings and make use of a planar base provided with a generally rectangular upstanding mounting block. The mounting block has a reduced width portion and an enlarged width portion, each provided with a transversely extending cylindrical bore. A conventional quick release spindle, of the type utilized to mount bicycle wheels on the slotted forks of a bicycle frame, is selectively received through one of these transverse bores. In use, one wheel of a bicycle is removed and the slotted forks are clamped against the mounting block by the quick release mechanism. By inserting the quick release spindle through either the reduced or the enlarged width portion of the mounting block, the device may be utilized with bicycles having two different standard fork frame width dimensions. The mounting plate is provided with apertures for the reception of threaded fasteners for securing the mounting block to a horizontal or vertical planar surface. In a second embodiment, the mounting block may be provided with rubber bumpers for abutment with the slotted bicycle forks, a pivotal mounting bracket for allowing the mounting block to be adjustably positioned on a planar mounting surface, and a hook for retaining the removed bicycle wheel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved quick release bicycle rack which has all the advantages of the prior art bicycle racks and none of the disadvantages.

It is another object of the present invention to provide a new and improved quick release bicycle rack which may be easily and efficiently manufactured and marketed.

It is a further object of the present invention to provide a new and improved quick release bicycle rack which is of a durable and reliable construction.

An even further object of the present invention is to provide a new and improved quick release bicycle rack which is susceptible of a low cost of manufacture with regard to both materials and labor, and which accordingly is then susceptible of low prices of sale to the consuming public, thereby making such bicycle racks economically available to the buying public.

Still yet another object of the present invention is to provide a new and improved quick release bicycle rack which provides in the apparatuses and methods of the prior art some of the advantages thereof, while simultaneously overcoming some of the disadvantages normally associated therewith.

Still another object of the present invention is to provide a new and improved quick release bicycle rack which may be mounted on any desired planar horizontal or vertical surface.

Yet another object of the present invention is to provide a new and improved quick release bicycle rack which is adapted for use with a variety of standard sizes of bicycle frame fork widths.

Even still another object of the present invention is to provide a new and improved quick release bicycle rack which utilizes a pivotal mounting bracket to enable the unobtrusive storage of a bicycle in narrow spaces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of the quick release bicycle rack according to the first embodiment of the present invention.

FIG. 2 is a side view of the quick release bicycle rack according to the first embodiment of the present invention.

FIG. 3 is an end view of the quick release bicycle rack according to the first embodiment of the present invention.

FIG. 4 is a cross sectional view, taken along line 4—4 of FIG. 1.

FIG. 5 is a perspective view illustrating the manner of use of the quick release bicycle rack according to the first embodiment of the present invention.

FIG. 6 is a top view of the quick release bicycle rack according to the second embodiment of the present invention.

FIG. 7 is a front view of the quick release bicycle rack according to the second embodiment of the present invention.

FIG. 8 is a top view of the quick release bicycle rack according to the present invention, illustrating the range of pivotal adjustment.

FIG. 9 is a side view of the quick release bicycle rack according to the second embodiment of the present invention.

FIG. 10 is a cross sectional view of the quick release bicycle rack according to the second embodiment of the present invention.

FIG. 11 is a side view illustrating the manner of usage of the quick release bicycle rack according to the second embodiment of the present invention.

DESCRIPTION OF THE PREFERRED EMBODIMENT

With reference now to the drawings, and in particular to FIG. 1 thereof, a new and improved quick release bicycle rack embodying the principles and concepts of the present invention and generally designated by the reference numeral 10 will be described.

More specifically, it will be noted that the first embodiment 10 of the invention includes a flat planar base 12 provided with a generally rectangular upstanding mounting block 14. Two semicircular recesses 15 are provided at opposite ends of the block 14 to allow access to circular apertures 18 provided through mounting flange portions 16 provided at opposite ends of the base 12. Through the use of conventional threaded fasteners, the quick release bicycle rack 10 may be secured to any desired surface. The mounting block 14 has a first reduced width portion 24 and a second enlarged width portion 26. A transverse cylindrical bore 20 and 22 extends through each of the enlarged 26 and reduced 24 width portions. A conventioanl quick release mounting spindle 28 may be selectively inserted through one of the bores 20 or 22. The quick release mounting spindle 28 is of a conventional construction and includes a clamping arm 30 and an adjustment nut 32. The quick release mounting spindle 28 is of the type utilized to secure the wheels of a bicycle to the slotted frame forks. The construction of the quick release clamping mechanism 28 forms no part of the present invention, and reference may be had to U.S. Pat. No. 3,848,784, which issued to K. Shimano et al on Nov. 19, 1974, for the constructional details thereof. The entire disclosure of U.S. Pat. No. 3,848,784, is hereby incorporated by reference. In use, the quick release bicycle rack 10 is fastened to an intended mounting surface by the use of conventional threaded fasteners inserted through the mounting flange portions 16 of the base 12. One wheel of a bicycle is removed and the slotted fork ends 10 are inserted over the quick release mounting spindle 28 and positioned against the mounting block 14. By moving the lever 30 to a closed position, the bicycle forks will be clamped against the sides of the mounting block 14. Bicycles with quick release hubs, ten speed types and off road-mounting bike types are manufactured with either of two different standard hub and fork widths; one standard width being 121 mm and the other standard width being 126 mm. The reduced width portion 24 of the mounting block 14 has a width of about three and seven eights inches to accommodate the smaller standard width and the enlarged width portion 26 of the block 14 has a width of about four inches to accommodate the larger standard fork width. Thus, mounting rack 10 may be adapted for use with either standard fork width size simply by selectively inserting the quick release mounting spindle 28 through the appropriate bore 20 or 22. This feature is important because the frame of a bicycle may be bent or sprung if the proper width rack is not utilized.

With reference now to FIG. 2, a side view of the quick release bicycle rack 10 is provided. The transverse bores 20 and 22 are each about one fourths inch in diameter and extend completely through the block 14.

As shown in FIG. 3, a semicircular recess 15 at each end of the block 14 allows tool relief for applying a threaded fastener through the mounting apertures 18 in the mounting flange 16.

In FIG. 4, a transverse cross sectional view, taken along line 4—4 of FIG. 1 is provided. As shown, the spaced bores 20 and 22 extend in spaced parallel relation through the block 14.

In FIG. 5, a perspective view is provided which illustrates the slotted front forks F of a bicycle in clamped position against the mounting block 14. The quick release bicycle rack 10 may be mounted on a vertical wall surface in a closet or hallway to allow a bicycle to be stored in an unobtrusive location. The quick release bicycle rack 10 may also be utilized in bicycle shops and on various vehicles to store bicycles.

In FIG. 6, a second embodiment 33 of a quick release bicycle rack according to the present invention is illustrated. A base 34 has a pair of spaced generally triangular wall portions 46, each provided with a circular aperture 48 for engagement with a generally U-shaped pivot rod 36. The pivot rod 36 is adapted for securement on a planar surface by a pair of mounting brackets 38 provided with conventional threaded fasteners 40. A pair of fork support ledges 50 are integrally formed with the base 34, and are each provided with a rubber bumper 52 to prevent damage to the ends of bicycle frame forks. A generally rectangular mounting block 35 is secured to the base 34. The mounting block 35 has a reduced width portion 24 and an enlarged width portion 26. A conventional quick release mounting spindle 28 is illustrated extending through a transverse cylindrical bore 22 which spans the reduced width portion 24 of the block 35. The clamping handle 30 may be utilized to clamp the slotted forks of a bicycle against the sides of the block 35. The threaded adjustment nut 32 of the quick release clamping spindle 28 allows the spindle 28 to be selectively adjusted or removed and inserted through a second spaced cylindrical bore 20 provided through the enlarged width portion 26 of the block 35.

As shown in the front view of FIG. 7, a pair of threaded fasteners 37 secure the mounting block 35 to the base 34. The fork supporting ledges 50 extend along opposite side edges of the block 35. A hook 42 has a mounting ring 44 received around the pivot rod 36. The hook 42 is utilized to retain the removed bicycle wheel when the bicycle forks are clamped against the block 35.

As shown in FIG. 8, the block 35 and base 34 may be pivoted about the axis of the pivot rod 36 to adjustably position a stored bicycle. This feature is useful in positioning a bicycle in a limited space and for allowing convenient access to both sides of a bicycle for repair purposes.

As shown in the side view of FIG. 9, the spaced triangular side walls 46 of the base 34 engage the pivot rod 36.

With reference to the cross sectional view of Figure 10, it may be understood that the spaced transverse bores 20 and 22 allow bicycles of two different standard fork widths to be clamped against the mounting block 35 by selectively positioning the quick release clamping spindle 28 through one of these spaced bores.

In the side view of FIG. 11, the quick release bicycle rack 33 is shown in use to clamp the conventional slotted front forks F of a bicycle B. The bicycle rack 33 is shown mounted on a vertical planar wall surface S. The removed wheel W of the bicycle B is retained by the hook 42. As may now be understood, a bicycle may be stored in an extremely limited space through the use of the quick release bicycle rack of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved quick release bicycle rack, comprising:
   generally rectangular base plate;
   a pair of parallel generally triangular side walls extending downwardly from opposite ends of said rectangular base plate;
   a circular aperture in each of said triangular side walls;
   a generally U-shaped pivot rod extending through said circular apertures;

a pair of mounting brackets at opposite ends of said pivot rod;

a hook having a mounting ring received around said pivot rod adjacent one of said mounting brackets;

a generally rectangular mounting block on an upper surface of said rectangular base plate;

said mounting block having a first reduced width portion and a second enlarged width portion;

a first transverse cylindrical bore extending through said first reduced width portion;

a second transverse cylindrical bore extending through said second enlarged width portion;

a quick release clamping spindle selectively received through one of said transverse cylindrical bore; and a pair of rubber bumpers on said base plate extending along opposite sides of said mounting block.

2. A quick release bicycle rack, comprising:

base means;

a generally U-shaped pivot rod on said base means for mounting said base means on a planar surface;

mounting block means on said base means;

cylindrical bore means extending through said mounting block means; and quick release clamping spindle means extending through said cylindrical bore means.

3. The quick release bicycle rack of claim 2, further comprising a pair of parallel triangular end walls on opposite ends of said base means;

a circular aperture through each of said triangular walls; and said U-shaped pivot rod received through said circular apertures.

4. The quick release bicycle rack of claim 3, further comprising a pair of fork supporting ledges on said base means extending along opposite sides of said mounting block means.

5. The quick release bicycle rack of claim 4, further comprising rubber bumpers on each of said fork ledges.

6. The quick release bicycle rack of claim 5, further comprising a hook mounted on said U-shaped pivot rod.

7. The quick release bicycle rack of claim 6, wherein said mounting block means has a first reduced width portion and a second enlarged width portion.

8. The quick release bicycle rack of claim 7, further comprising a first transverse cylindrical bore extending through said first reduced width portion and a second transverse cylindrical bore extending parallel to said first cylindrical bore through said second enlarged width portion.

9. A quick release bicycle rack for securing bicycles having either of two different standard frame fork widths, comprising:

a base having a flat bottom surface;

a generally rectangular mounting block on an upper surface of said base;

a pair of semicircular recesses formed at opposite ends of said mounting block;

a pair of apertured mounting flanges on said base, one of said flanges adjacent each of said semicircular recesses;

said mounting block having a first reduced width portion dimensioned to receive bicycle forks of a smaller of said two different standard frame fork widths and a second enlarged width portion dimensioned to receive bicycle forks of a larger of said two different standard frame fork widths;

a first transverse cylindrical bore extending through said first reduced width portion;

a second transverse cylindrical bore extending parallel to said first transverse cylindrical bore through said second enlarged width portion;

and a quick release clamping spindle selectively received through one of said transverse cylindrical bores.

* * * * *